(12) United States Patent
Bowen et al.

(10) Patent No.: US 8,642,937 B1
(45) Date of Patent: Feb. 4, 2014

(54) FULL-APERTURE, BACK-ILLUMINATED, UNIFORM-SCENE FOR REMOTE SENSING OPTICAL PAYLOAD CALIBRATION

(75) Inventors: Howard Sain Bowen, Pittsford, NY (US); David Ferd House, Pittsford, NY (US)

(73) Assignee: Exelis, Inc., McLean, VA (US)

( * ) Notice: Subject to any disclaimer, the term of this patent is extended or adjusted under 35 U.S.C. 154(b) by 579 days.

(21) Appl. No.: 12/788,783

(22) Filed: May 27, 2010

(51) Int. Cl.
*G01C 21/02* (2006.01)
*H01J 3/14* (2006.01)

(52) U.S. Cl.
USPC ........................................ 250/203.4; 250/216

(58) Field of Classification Search
USPC ............... 250/208.1, 221, 216, 203.1, 203.3, 250/203.4, 239; 356/139.01, 139.02; 136/246, 244, 245; 126/569, 572, 573; 702/40, 85, 94, 104; 73/1.01, 1.75, 73/170.27
See application file for complete search history.

(56) References Cited

U.S. PATENT DOCUMENTS

| | | | |
|---|---|---|---|
| 5,659,168 A * | 8/1997 | Dey et al. | 250/208.1 |
| 7,166,825 B1 | 1/2007 | Smith et al. | |
| 7,482,572 B1 | 1/2009 | Galvin | |
| 7,576,346 B1 * | 8/2009 | Smith et al. | 250/559.1 |
| 7,873,257 B2 * | 1/2011 | Morgan | 385/146 |
| 2002/0139414 A1 * | 10/2002 | Vasylyev et al. | 136/246 |
| 2010/0127157 A1 * | 5/2010 | Tamaki et al. | 250/208.1 |

* cited by examiner

*Primary Examiner* — Pascal M Bui Pho
(74) *Attorney, Agent, or Firm* — RatnerPrestia

(57) ABSTRACT

An apparatus, system and method for the radiometric calibration of an optical payload consisting of a housing with an optical aperture, at one portion. The optical aperture is utilized for passing light to an imaging device. The housing also includes at least one door located at another portion of the housing. The door receives and directs light into the housing and toward the optical aperture. The door includes a plurality of holes which are disposed directly in the door. When the housing is moved through predetermined angles relative to the sun, the plurality of holes are capable of passing light into the housing at calibrated levels of radiance.

23 Claims, 7 Drawing Sheets

FULL-APERTURE, BACK-ILLUMINATED, UNIFORM-SCENE FOR REMOTE SENSING OPTICAL PAYLOAD CALIBRATION

FIELD OF THE INVENTION

The present invention is directed to energy calibration equipment used in spacecraft, and more particularly, to calibration equipment for remote sensing devices.

BACKGROUND OF THE INVENTION

Planetary imagers are useful for remote sensing of atmospheric compositions, crop assessments, weather prediction and other types of monitoring activities. Monochromatic and multispectral satellite-based, remote sensors are able to measure properties of the atmosphere above the earth, when their detector arrays are properly calibrated for radiometric response.

A method of calibrating the radiance measured by these remote sensors is to create a reference radiation using a known source of spectral irradiance, such as the sun. The radiation from the sun may be used as a reference signal which, in turn, may provide a known radiance to a remote sensor for calibrating its detector arrays.

The output of the detector arrays may be measured as the remote sensor receives the known energy from sunlight or a diffusive reflector. This radiance calibration method provides sufficient information to correctly measure and calculate other types of radiance incident on the remote sensor during normal operation, when using the output of the remote sensor, as the remote sensor views the earth or other target of interest.

In the prior art, there are at least four different methods for calibrating the radiance measured by the sensors. One of these methods is the use of Calibration Light Source Assemblies (hereinafter "CLSA"). CLSAs use the sun as a source of illumination and provide a partial aperture illumination. A second method is the use of a Full Aperture Calibration Door (hereinafter "FACD"). An FACD provides a coating on the inner surface of a calibration door. During the calibration process, the door is opened and the coated inner surface reflects the sun towards the aperture. This provides full or partial aperture illumination. A third method is called Full-Aperture Calibration Surface (hereinafter "FACS"). In the FACS method, a medium or coating is applied to a surface. The surface is then moved into position to reflect the sun as a source of illumination. As with the FACD method, this method provides full or partial aperture illumination. Finally, another method that may be employed is an On-board Calibration Source (hereinafter "OBCS"). In the OBCS method, incandescent lamps, light emitting diodes, or other portable electromagnetic sources (including, but not limited to, radiative black bodies) are used to provide the illumination. The lamps, diodes, and/or other sources are positioned in front of the aperture or otherwise placed such that they illuminate direct energy towards the sensor when calibration is required.

SUMMARY OF THE INVENTION

To meet this and other needs, and in view of its purposes, the present invention provides a solar calibration device for an optical payload. The solar calibration device includes a housing having an optical aperture, at one portion of the housing, for passing light to an imaging device, and includes at least one door in a closed position, at another portion of the housing, for receiving and directing light toward the optical aperture. The door includes a plurality of holes, disposed directly in the door, configured to pass light into the housing, when the housing is moved to a predetermined angle relative to the sun, and the door is in a closed position.

The door of the radiometric calibration device may be either a single panel door attached to the housing or a multi-panel door attached to the housing. Some embodiments of the present invention may include a diffuser configured to pass light towards the optical aperture. This diffuser may be a transmissive diffuser and may be attached to the door panel. The door of the radiometric calibration device may include a plurality of supports and diffuser plates may be placed between the plurality of supports, or a diffuser may be bonded to the plurality of supports. The door may be in a honeycomb-shaped support structure. In some embodiments of the invention two or more doors, may be placed adjacent to the first door. The second door may be displaceable in regards to the first door and may be capable of being slid into a position that allows a light to pass through both doors and a position where light will not pass through both doors.

The plurality of holes may be arranged in any number of patterns including a rectangular pattern, a radial pattern, a random pattern or in any another geometric pattern. At least one of the plurality of holes may be tapered, curved or change the angles of redirect. In some embodiments of the present invention, the radiometric calibration device's door and the plurality of holes in the door may allow light to pass into the housing, when the housing is moved through a range of predetermined angles relative to the sun. In some embodiments of the present invention, the imaging device may also be calibrated by varying light sensitivity levels to account for different applications for the imaging device.

Embodiments of the present invention also relate to a method of calibrating an optical payload. The steps of this method include positioning a closed door, affixed to a housing, at a first angle with respect to the sun, for preventing light from entering the housing. The closed door may then be positioned at a second angle with respect to the sun. Light from the sun may then be transmitted through a plurality of holes formed in the closed door to an optical sensor disposed within the housing when the closed door is at the second angle with respect to the sun. Finally, this light may then be used to calibrate the optical sensor.

Embodiments of the present invention further relate to a system deployed in orbit around the earth. This system deployed in orbit includes an optical payload and an imaging sensor having a calibration mode and an operational mode. The imaging sensor is configured to receive radiometric radiation during the calibration mode and reflected radiation from the earth during the calibration mode. The system also includes a housing having an optical aperture, at one portion, for passing light to the imaging sensor, and the housing includes at least one door, at another portion, for receiving and directing light toward the optical aperture. The door includes a plurality of holes, disposed directly in the door, configured to pass light into the housing, when the housing is moved to a predetermined angle relative to the sun.

It is understood that the foregoing general description and the following detailed description are exemplary, but not restrictive, of the invention.

BRIEF DESCRIPTION OF THE DRAWINGS

The foregoing summary, as well as the following detailed description of exemplary embodiments of the invention, may be better understood when read in conjunction with the appended drawings, which are incorporated herein and constitute part of the specification. For the purposes of illustrating the invention, exemplary embodiments of the present invention are shown. It will be understood, however, that the invention is not limited to the precise arrangements and instrumentalities shown. In the drawings, the same reference numerals are employed designating the same elements throughout the several figures. In the drawings.

DETAILED DESCRIPTION OF THE INVENTION

Although the invention is illustrated and described herein with reference to specific embodiments, the invention is not intended to be limited to the details shown. Rather, various modifications may be made in the details within the scope and range of equivalents of the claims and without departing from the invention.

The present invention relates to a calibration system for calibrating a remote sensing system optical payload. As described in the background of the invention, numerous methods are known in the prior art to calibrate optical payloads. These methods, however, include disadvantages. For instance, CLSAs provide only partial aperture illumination and remain as an obstruction in the telescope aperture when not in use. Furthermore, CLSAs require sensitive optical alignments, which in turn, require additional processing power and calibration time.

With FACDs, the coating disposed on the calibration surface degrades over time, thereby altering the calibration obtained at different periods. The door surface must be made extremely flat to avoid shadowing at low angles of incidence. To properly calibrate the payload, the angle of the opened door with respect to its housing must be known accurately. The FACD also consumes considerable power during calibration upon moving the door into position and holding the payload in a proper orbit.

With FACSs, as with FACDs, the reflective coating used on the door surface degrades, thereby altering the calibration as time goes on. Furthermore, the reflective surface must be deployed into proper position when in use, many systems of which require a high precision angular encoder, and stowed when not in use. This requires additional processing.

Finally, with OBCSs, the incandescent lamps, LEDs, or other electromagnetic sources (hereinafter "EMS") may degrade and burn out over time. The incandescent lamps, LEDs, or other EMS also require additional power when illuminated during a calibration process.

The present invention avoids these disadvantages by including a system that uses sunlight to calibrate the optical payload, without requiring the panel door to be moved. During calibration, the panel door remains in a closed position. Therefore, no additional power is required during the calibration process. In addition, the door's angle with respect to the sun may be controlled by an onboard attitude control system used for attitude control of the satellite, rather than a specially built control mechanism used for opening and closing a door.

Figure 1:
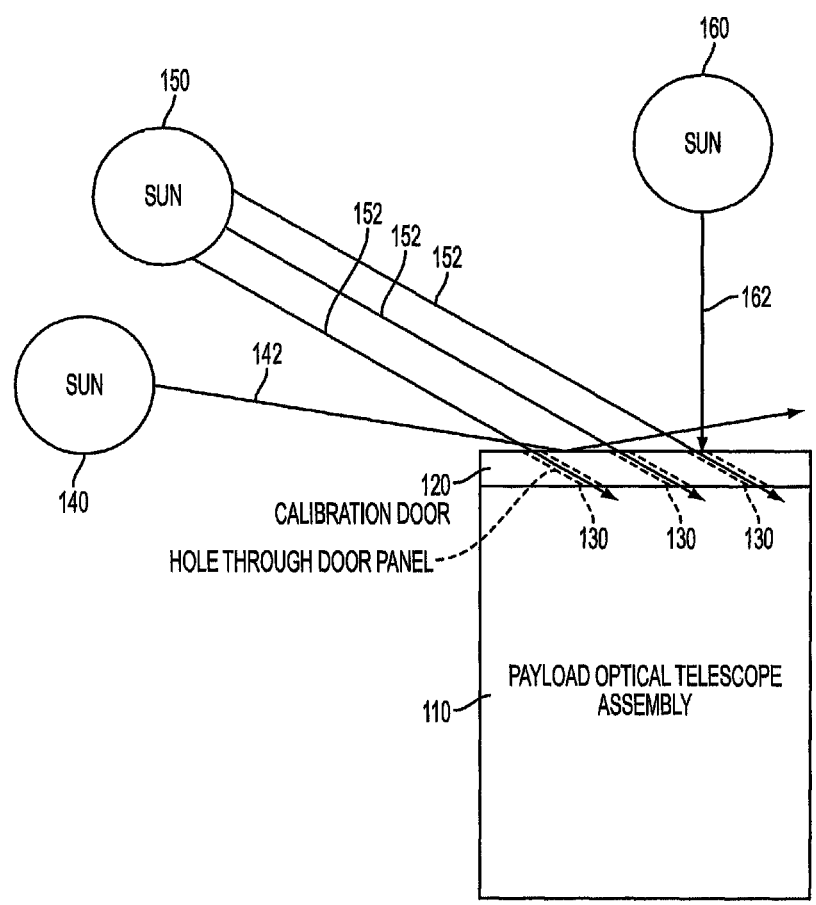
FIG. 1 is a perspective-view illustration of an interaction of the rays of the sun with a calibration door. Three different orientations of the sun with respect to the optical payload telescope assembly are included.

As shown in FIG. 1, payload optical telescope assembly 110 is fitted with calibration door 120. Calibration holes 130 are formed in calibration door 120. These calibration holes may be formed as straight-through apertures from the input surface to the output surface, as shown in FIG. 1, or in a number of other configurations.

Calibration holes 130 are formed at an angle with respect to the horizontal plane of the door, as shown in FIG. 1. This advantageously permits sunlight to pass through calibration door 120 only when the sun is located at predetermined angles with respect to the door. As shown in FIG. 1, the calibration holes are formed such that when the sun is at position 140, sunlight does not pass through the calibration door. At that position, photons 142 are reflected off the top of the calibration door and away from optical telescope assembly 110. The photons do not pass through the calibration door because the angle of entry of the photons does not align with the angle of the calibration holes.

Similarly, when the sun is at position 160, photons 162 do not pass through calibration door 120. Most photons 162 reflect off the top of the calibration door. When the sun is in position 150, however, photons 152 pass through the calibration door. When the sun is in position 150, the angle of photons 152 matches the angle of incidence of the calibration holes and allows the solar illumination to enter the payload optical telescope assembly. Therefore, during a normal course of the payload's orbit, when a proper alignment is achieved between the angle of incidence of the calibration holes and the sunlight angle, the photons would pass through the calibration door and a full-aperture calibration may be performed.

Similarly, the incidence angle of calibration holes 130 may be set such that during a normal orbit of the payload, the sun never aligns at a correct angle for full-aperture calibration. In this example, the payload may be re-oriented to achieve a proper alignment with the sun in order to perform a full-aperture calibration. Re-orienting the entire payload is easier and more accurate than in conventional calibrations that move a door between an operational position and a stowed position. No additional motors are required by the present invention over and above those required for normal payload orbiting maneuvers.

In some exemplary embodiments of the present invention, it may be possible to allow different concentrations of photons through the calibration door 120. In some embodiments, as the optical payload is oriented around the sun and the relative position of the sun changes from position 140 to position 160, it may be possible to have different angles allow different concentrations of photons to enter the calibration door 120. This possibility depends upon the size and shape of the holes as well as the desired uses for the optical payload. The sensor system in these embodiments may be programmed to received different concentrations of photons in accordance with the angle of the optical payload to the sun. In these cases, the sensors and the optical payload may be able to be calibrated such that the optical payload has different light sensitivities that may be used in different applications.

Figure 2:
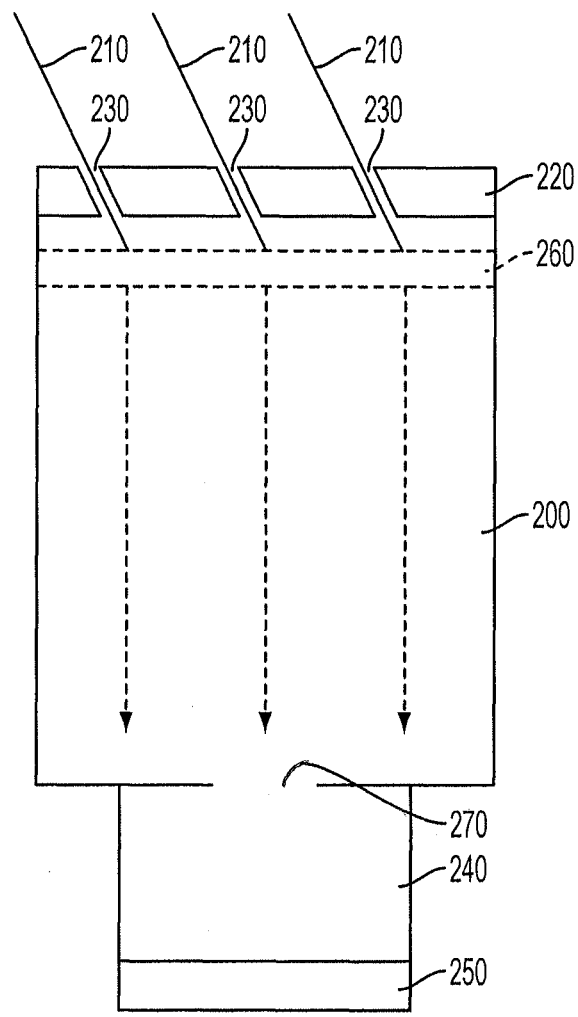
FIG. 2 is a cross-sectional illustration of the rays of the sun with a calibration door for calibrating the optical payload.

FIG. 2 shows an exemplary cross-sectional view of rays of sunlight 210 entering housing 200 during a calibration process. When housing 200 is moved into a predetermined orientation relative to the sun, rays 210 align with calibration holes 230 formed in calibration door panel 220. Once rays 210 pass into the calibration holes, the rays may be transmitted downwardly towards the opposite end of the housing as shown in FIG. 2, or rays 210 may be directed into an optional transmissive diffuser 260. Importantly, rays 210 are directed toward optical device 240 through the receiving aperture 270 for calibrating its sensor array 250. Sensor array 250 may be placed opposite calibration door 220, or may be moved into a proper position for calibration. Sensor array 250 may also be calibrated after properly orienting one or more optical elements (not shown) to transmit the sun's rays onto the sensor array.

The present invention provides several advantages over the prior art. Specifically, the calibration door provides a full-aperture uniform illumination scene at the entrance aperture of the telescope, out of focus of the optical instrument. The use of rear illumination to perform the calibration eliminates the requirement that the door surface be flat. This happens because rear illumination avoids the shadowing effects that may occur with front illumination calibration. The angle of the calibration holes may be chosen such that the photons cannot enter the telescope aperture without making contact with at least one surface. This can provide the user with the option to make the contacting surface a dispersion surface which may aid the calibration process. Furthermore, the angle of the calibration holes may be designed and arranged to provide uniform illumination for specific wavelength regions and/or illumination intensities.

Additionally, as illustrated in FIGS. 6K, 6L and 7C-7F, the door panel may be fitted with a semi-transparent medium that allows for back-illumination to uniformly disperse the solar radiation. A final advantage of the present invention is that the angle of the calibration holes does not change over time. Because the angle of the calibration holes does not change, the optical payload is provided with uniform solar illumination for every calibration event throughout the life of the mission.

Figure 3C:
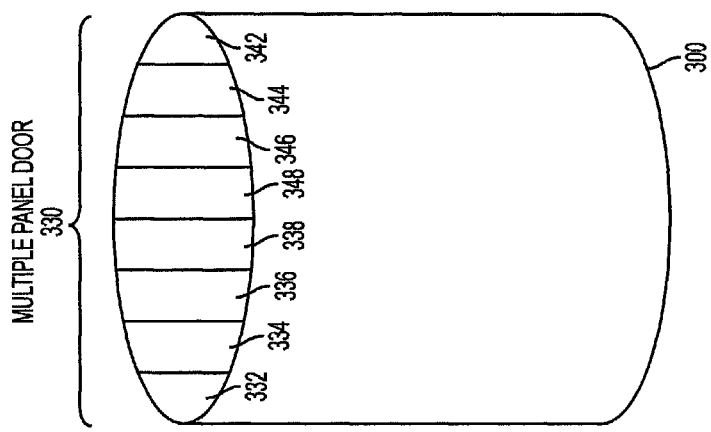
FIG. 3C is a perspective-view illustration of a payload optical telescope assembly with a multiple panel door.
Figure 3B:
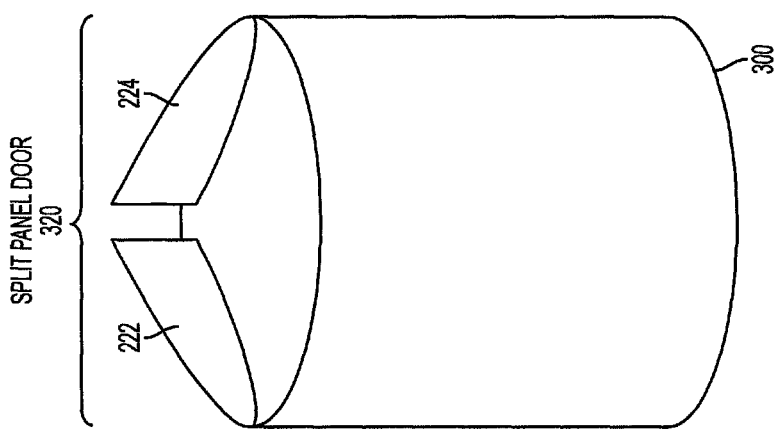
FIG. 3B is a perspective-view illustration of a payload optical telescope assembly with a split panel door.
Figure 3A:
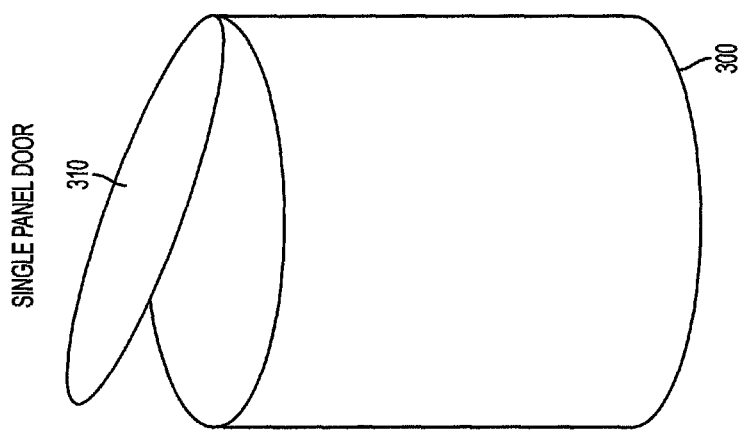
FIG. 3A is a perspective-view illustration of a payload optical telescope assembly with a single panel door.

Referring next to FIGS. 3A-3C, there are shown various types of door panels that may be used by the present invention. In FIG. 3A, payload optical telescope assembly 300 is fitted with a single door panel 310. Single door panel 310 is pivotally attached at one location to optical telescope assembly 310. As shown in FIG. 3A, the single door panel may be circular to match the circular shape of an optical telescope assembly, or may be any other shape such as rectangular, square or elliptical.

FIG. 3B shows a payload optical telescope assembly 300 fitted with a split panel door 320. Split panel door 320 is divided into two panels 322 and 324. Panels 322 and 324 are pivotally attached to optical telescope system 300. In instances where the optical instrument needs to be accessed, panels 322 and 324 may be opened. As shown, the split panel door may be circular to match the circular shape of the optical telescope assembly, or may be any other shape, such as rectangular, square, or elliptical.

FIG. 3C shows a telescope assembly 300 fitted with a multiple panel door 330. Multiple panel door 330 is divided into multiple panels 332, 334, 336, 338, 342, 344, 346 and 348. Multiple panel door 330 may be attached through a track system (not shown) that allows the multiple panel door 330 to be retracted across the top of the optical telescope assembly 300 such as with a garage door, or individually pivoted such as with a louvered window. As in the other configurations, the split panel door 320 may be circular, rectangular, square, or elliptical.

Figure 4:
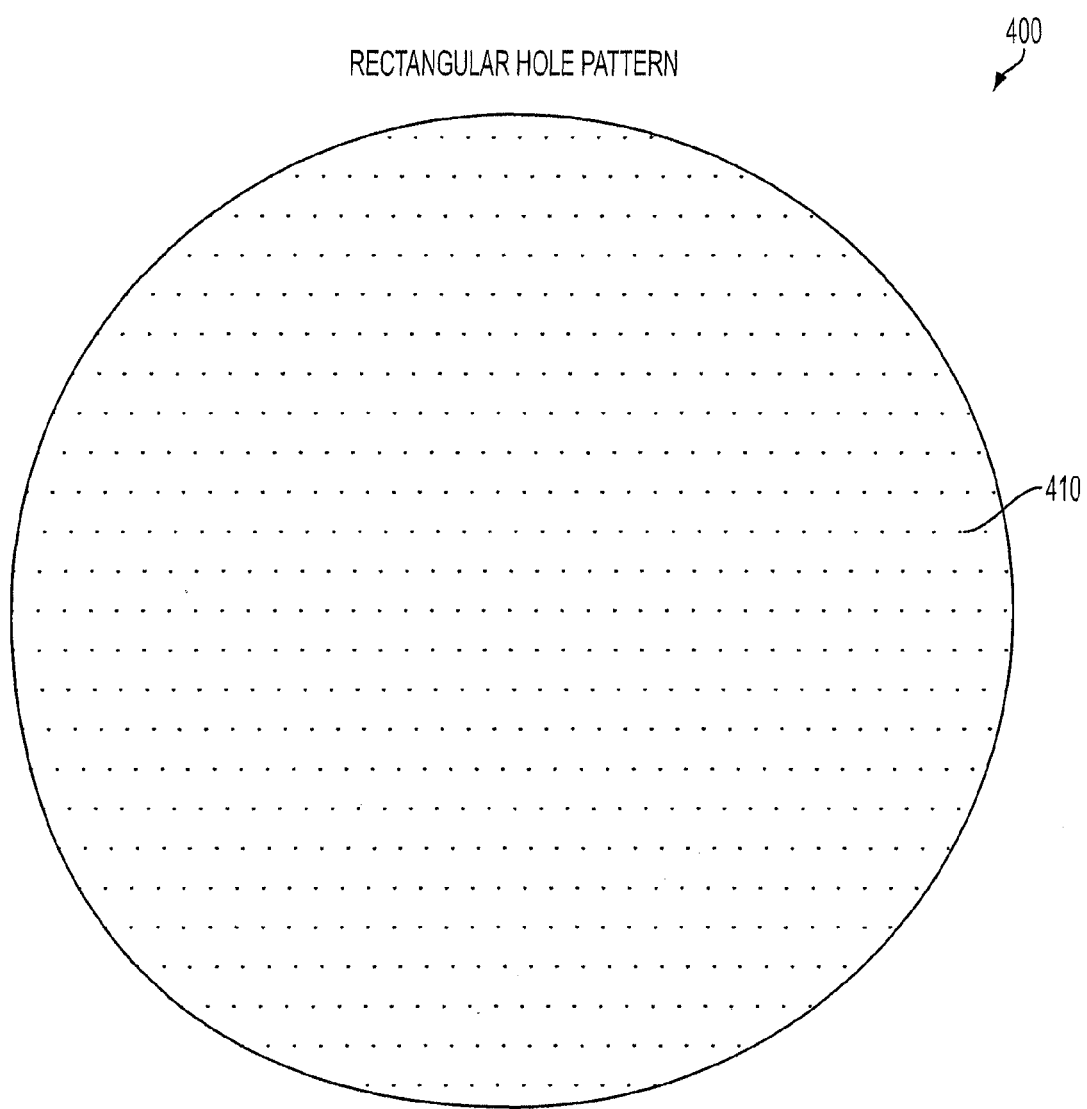
FIG. 4 is a top-view illustration of a single panel door with a rectangular hole pattern.

During construction of the telescope system, a radiometric analysis may be performed to determine the shape, size and pitch of the apertures included in the door panel. A possible calibration hole layout may be a rectangular hole pattern as shown in FIG. 4. As shown, calibration door 400 includes a pattern of calibration holes 410 formed in multiple rows. The calibration holes have the same horizontal distance within each row, and the separation between each row may have the same vertical distance. Each row may be offset horizontally from an adjacent row, as shown in FIG. 4, or may not be offset.

The diameter of each hole may be at least 1.0 centimeter. For larger-sized calibration doors, such as 1.5 meters or larger in diameter, the space between each hole may be at least 5 centimeters. For smaller-sized calibration doors, the space between each hole may be less than 5 centimeters. It will be appreciated, however, that these numbers may change based on light sensitivity analysis of the optical payload.

Figure 5:
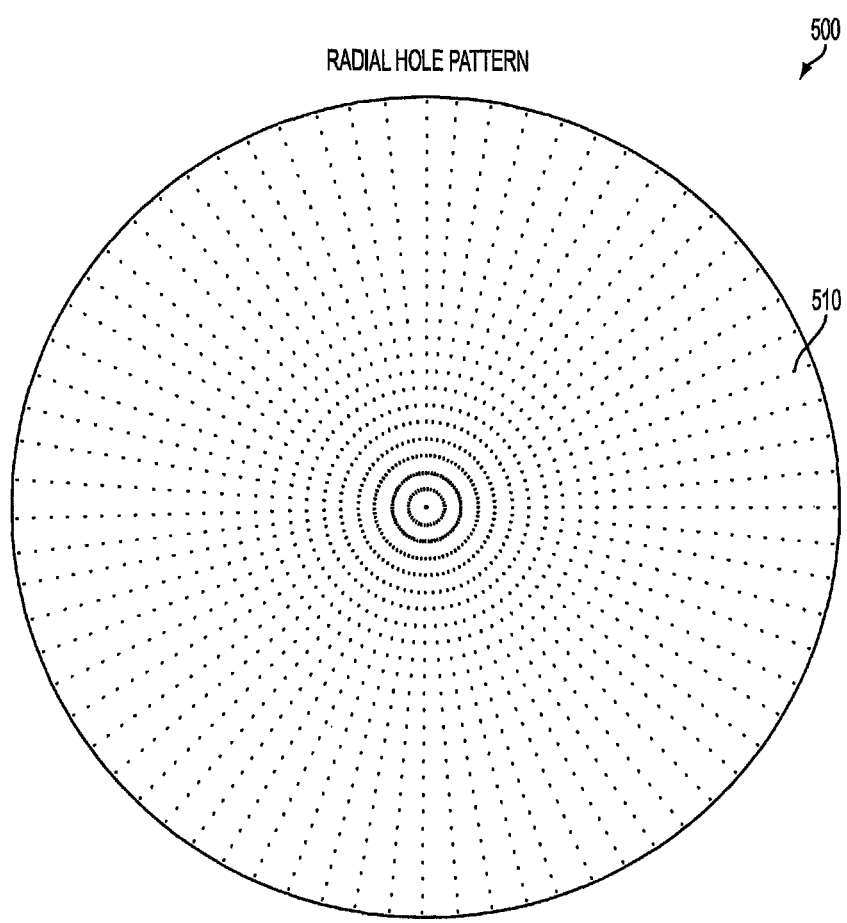
FIG. 5 is a top-view illustration of a single panel door with a radial hole pattern.

FIG. 5 shows another pattern that may be used as an embodiment of the present invention. As shown, calibration holes 510 are arranged in a radial pattern. The density of calibration holes 510 increases towards the center of calibration door 500, whereas the spacing between the holes increases towards the outer end of calibration door 500. This pattern may be utilized for optical payloads that require greater brightness towards the center portion of its receiving aperture, and require less brightness towards the outer portion of the receiving aperture. Conversely, an optical configuration with a large central obstruction may opt to have no hole pattern in the vignetted portion of the optical field of view. As described with respect to FIG. 4, the spacing, or pitch between calibration holes 510 and the size of each calibration hole may be determined by a radiometric analysis.

The present invention is not limited to the patterns that are disclosed in FIGS. 4 and 5. In addition, the distribution of calibration holes may be completely random, or may be deterministically random in appearance.

FIGS. 6A-6H illustrate exemplary embodiments of various apertures that may be used for the calibration holes. The present invention is not limited to the shapes that are shown, but rather the intent is to show the flexibility of the aperture shapes, which may be based on a radiometric analysis. Essentially, any shape, size, or taper angle is possible provided that the hole allows photons to reach the radiometric device under calibration.

Figures 6A, 6B, 6C, 6D, 6E, 6F, 6G, 6H, 6I, 6J, 6K, 6L:
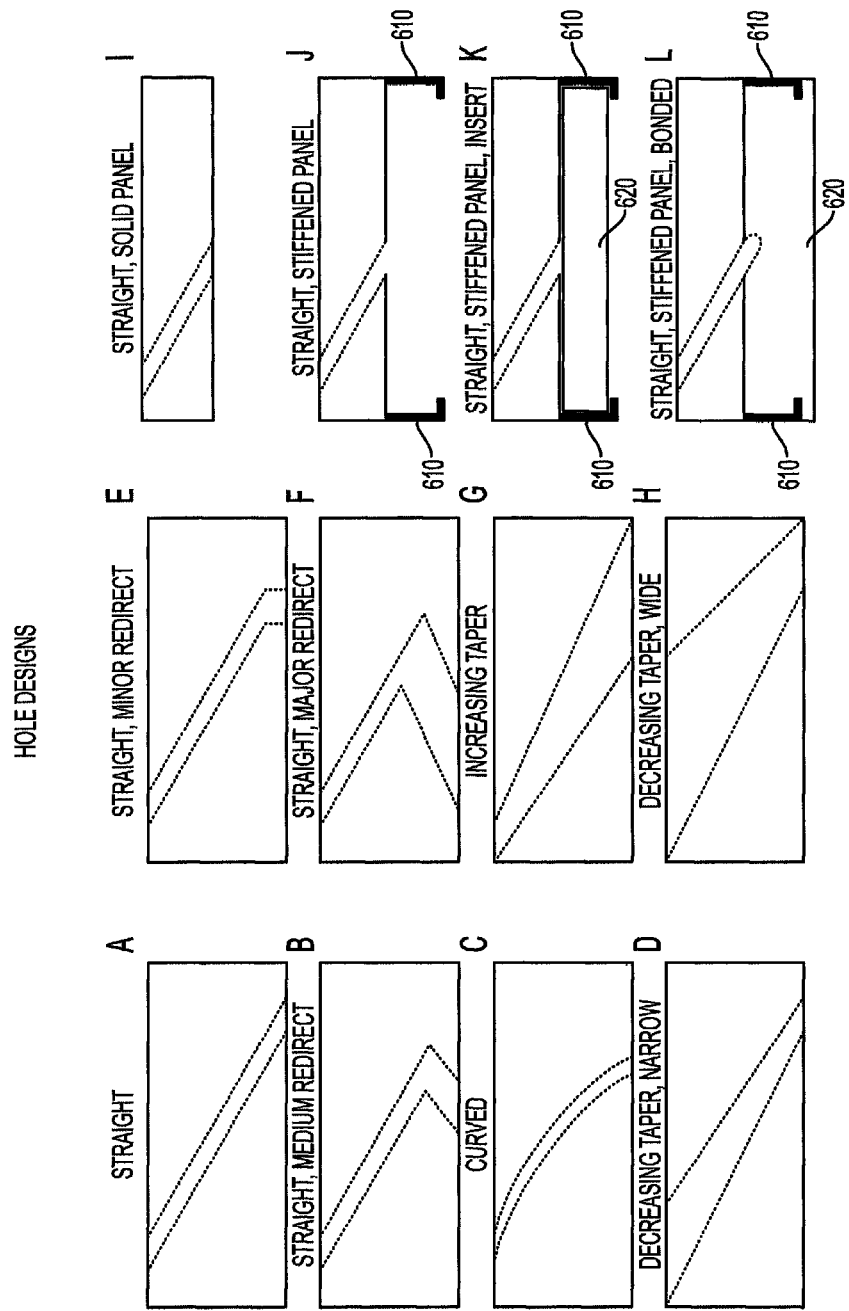
FIGS. 6A-6I are cross-sectional illustrations of various shapes of panel door holes that may be used by the present invention.
FIGS. 6J-6L are cross-sectional illustrations of panel door holes that may be used by the present invention together with a panel insert.
Figures 7A, 7B, 7C, 7D, 7E, 7F:
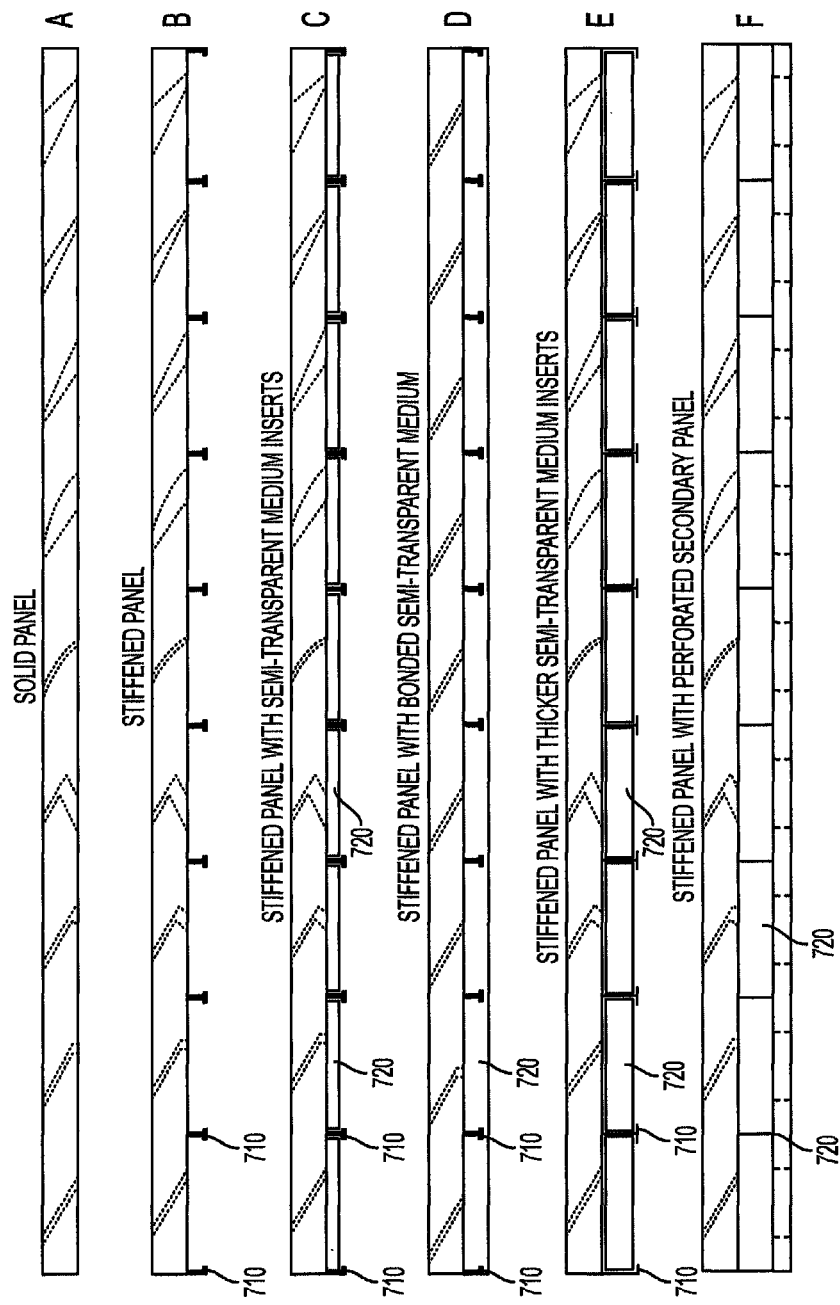
FIG. 7A is a cross-sectional illustration of an unsupported panel door.
FIGS. 7B-7F are cross-sectional illustrations of various supports used to reinforce a panel door, in accordance with embodiments of the present invention.

FIGS. 6I-6L and FIGS. 7A-7F illustrate different calibration doors that may be utilized by the present invention, depending on the aperture size of the receiving device under calibration and the required sturdiness of the calibration door. As shown in FIGS. 6I and 7A, for smaller doors, the calibration door may include a single panel. For larger payloads, additional support may be needed for the calibration door. In such case, a single panel may be used supplemented with supports 610 or 710, as illustrated in FIGS. 6J and 7B. Supports 610, 710 provide the door with additional structure to prevent bending, warping, or movement during various operations of the payload, and opening and closing of the door. Supports 610, 710 may be of any size or shape, including longitudinal or latitudinal support slats, honeycomb shaped supports 720 (illustrated in FIG. 7F), or other lattice shapes.

Similarly, for additional support, a semi-transparent material 620, or 720 may be placed between supports 610 or 710, respectively, as shown in FIGS. 6K and 7C. The semi-transparent material 620, 720 may be used as a diffuser to diffuse the sunlight, before it reaches the receiving aperture of the radiometer under calibration. Such diffusers may be transmissive or reflective in nature. Transmissive diffusers may be made from ground or frosted glass; they may also be made from opal glass or small particulate scatterers placed in a transparent matrix. Transmissive diffusers may also be made from screens, or pinhole arrays. Still another type of diffuser may be a diffractive diffuser, such as diffractive scatterers formed from micro-lens arrays or holographic material.

The semi-transparent material 620, 720 may be placed between supports 610, or 710, as shown in FIGS. 6K and 7C, or may be bonded with the supports, as shown in FIGS. 6L and 7D. Furthermore, depending upon the amount of diffusiveness of the transparent material, the calibration hole may be drilled through the calibration door, but not into the semi-transparent material disposed between the supports and under the calibration door. This is illustrated in FIG. 6K.

In an alternative embodiment, as shown in FIG. 6L, the calibration hole is drilled through the calibration door and partially into the semi-transparent material 620. Although not shown, it will be understood that the calibration hole may be drilled through the entire width of the calibration door and the entire width of semi-transparent material 620.

As illustrated in FIGS. 7C and 7E, the semi-transparent material inserted between the supports may be made as thin or as thick as the supports themselves. The thickness of the semi-transparent material may depend on the amount of support needed, and the diffusive qualities of the semi-transparent material.

In yet another embodiment of the present invention, two or more calibration doors may be stacked on top of one another. These doors may be displaced in relation to one another, so that the calibration holes on each door may be aligned to allow light to pass through each door. With this double or multiple door alignment, the optical payload may be rotated into position, and the doors may be aligned to each other to allow passage of light to the radiometer under calibration. In multiple-panel door embodiments, using a multiple door alignment may not require all panels in the doors to have calibration holes. In these embodiments, this will allow only some panels to be aligned to allow light to pass through the door.

Although this invention is discussed primarily in use with an orbit based optical payload system, it is understood that this invention may be used with any number of optical payloads that require calibration. Some embodiments of this invention may be used with Commercial Remote Sensing Payloads including NextView, WorldView, and AdvancedView. Furthermore, it is envisioned that embodiments of this invention may also be used with various Government Remote Sensing Payloads. Embodiments of this invention may also be used with Scientific Remote Sensing Payloads such as ABI, VIIRS, GEOS or CRIIS. Finally, embodiments of this invention may also be used with Ground-based Calibration Equipment as a cost effective replacement for very Large Integrating Spheres.

While preferred embodiments of the invention have been shown and described herein, it will be understood that such embodiments are provided by way of example only. Numerous variations, changes and substitutions will occur to those skilled in the art without departing from the spirit of the invention. Accordingly, it is intended that the appended claims cover all such variations as fall within the spirit and scope of the invention.

What is claimed:

1. A device for calibrating an optical payload comprising:
the optical payload configured to orbit a planet,
a housing having an optical aperture, at one portion of the housing, for passing light to an imaging device, and
including at least one adjustable door in a closed position, at another portion of the housing, for receiving and directing light toward the optical aperture,
wherein the door includes a plurality of holes, fixedly formed in the door, configured to pass light into the housing, when the entire housing is moved to a predetermined angle relative to the sun,
each hole is formed by a fixed circular wall in the door, and each hole is fixedly formed through the door and cannot be adjusted,
the holes are spaced apart from each other by at least one fixed distance and the holes are arranged across the door in at least one fixed pattern, and
the holes are configured to pass light into the housing without reflecting off the walls that form the holes.

2. The device of claim 1, wherein the door further comprises a single panel attached to the housing.

3. The device of claim 1, wherein the door further comprises a multi-panel door.

4. The device of claim 3, wherein the multi-panel door further comprises two panels, wherein each panel is attached at different positions of the housing.

5. The device of claim 3, wherein the multi-panel may be retractable across the housing along a track system.

6. The device of claim 1, wherein the plurality of holes are arranged in a rectangular pattern.

7. The device of claim 1, wherein the plurality of holes are arranged in a radial pattern.

8. The device of claim 1, wherein the plurality of holes are arranged in a random or a non-random geometric pattern.

9. The device of claim 1, further comprising a diffuser configured to pass light towards the optical aperture.

10. The device of claim 9, wherein the diffuser is a transmissive diffuser.

11. The device of claim 9, wherein the diffuser is attached to the door panel.

12. The device of claim 1, wherein the door further comprises a plurality of supports.

13. The device of claim 12, wherein diffuser plates are placed between the plurality of supports.

14. The device of claim 12, wherein a diffuser is bonded to the plurality of supports.

15. The device of claim 1, wherein the door further comprises a honeycomb-shaped support structure.

16. The device of claim 1, wherein at least one of the plurality of holes is tapered.

17. The device of claim 1, wherein at least one of the plurality of holes is curved.

18. The device of claim 1, wherein at least one of the plurality of holes changes angles of redirect.

19. The device of claim 1, further comprising a second door, wherein the second door is adjacent to the at least one door, defined as a first door, wherein the second door is displaced in regards to the first door and is capable of being displaced into a position that allows a light to pass through both doors and a position where light does not pass through both doors.

20. The device of claim 1, wherein the door includes a plurality of holes, disposed directly in the door, configured to pass light into the housing, when the housing is moved through a range of predetermined angles relative to the sun.

21. The device of claim 20, wherein the imaging device may be calibrated by varying light sensitivity levels to account for different applications for the imaging device.

22. The device of claim 1, further comprising a multiplicity of doors.

23. A system deployed in orbit around earth including:
an optical payload for orbiting the Earth, including an imaging sensor;
the imaging sensor having a calibration mode and an operational mode, wherein the sensor is configured to receive solar radiation during the calibration mode and reflected radiation from the earth during the operational mode;
a housing having an optical aperture, at one portion, for passing light to the imaging sensor, and
the housing including at least one adjustable door, at another portion, for receiving and directing light toward the optical aperture,
wherein the door includes a plurality of holes, fixedly formed in the door, configured to pass light into the housing, when the entire housing is moved to a predetermined angle relative to the sun, and
each hole is formed by a fixed circular wall in the door, and cannot be adjusted, and
the holes are configured to pass light into the housing without reflecting off the walls that form the holes.

* * * * *